US009100990B2

(12) United States Patent
Backes

(10) Patent No.: US 9,100,990 B2
(45) Date of Patent: *Aug. 4, 2015

(54) WIRELESS MESH ARCHITECTURE

(71) Applicant: Piccata Fund Limited Liability Company, Wilmington, DE (US)

(72) Inventor: Floyd Backes, Sharon, MA (US)

(73) Assignee: Piccata Fund Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,255

(22) Filed: Sep. 24, 2013

(65) Prior Publication Data

US 2014/0022948 A1 Jan. 23, 2014

Related U.S. Application Data

(63) Continuation of application No. 12/356,232, filed on Jan. 20, 2009, now Pat. No. 8,565,164, which is a continuation of application No. 11/054,221, filed on Feb. 9, 2005, now Pat. No. 7,505,751.

(51) Int. Cl.
H04W 84/18 (2009.01)
H04W 76/02 (2009.01)

(52) U.S. Cl.
CPC .............. *H04W 84/18* (2013.01); *H04W 76/02* (2013.01); *Y02B 60/50* (2013.01)

(58) Field of Classification Search
None
See application file for complete search history.

(56) References Cited

U.S. PATENT DOCUMENTS

| 6,266,702 | B1 | 7/2001 | Darnell et al. |
| 6,434,117 | B1 | 8/2002 | Momona |
| 6,795,407 | B2 | 9/2004 | Chesson |
| 6,870,815 | B2 | 3/2005 | McFarland et al. |
| 7,031,288 | B2 | 4/2006 | Ogier |
| 7,283,508 | B2 | 10/2007 | Choi et al. |
| 7,835,339 | B1 * | 11/2010 | Benveniste ................... 370/344 |
| 2003/0161268 | A1 * | 8/2003 | Larsson et al. ............... 370/229 |
| 2004/0085926 | A1 | 5/2004 | Hwang et al. |
| 2004/0157637 | A1 * | 8/2004 | Steer et al. .................... 455/525 |

(Continued)

OTHER PUBLICATIONS

Perlman, R., et al., RBridges: "Transparent Routing", Internet draft expires Jan. 17, 2005 taken from www.ietf.org/internet-drafts/draft-periman-rbridge-01.txt Dec. 20, 2004.

(Continued)

*Primary Examiner* — Hassan Kizou
*Assistant Examiner* — Roberta A Shand
(74) *Attorney, Agent, or Firm* — Panitch Schwarze Belisario & Nadel LLP

(57) ABSTRACT

A wireless mesh network architecture includes a plurality of wireless nodes, with each wireless node in the network is connected to every other wireless node in the network. Each pair of wireless nodes is coupled by a link dedicated to exchange of data by the pair of nodes. The link is characterized by an agreement between two end points of the link to rendezvous for the purposes of exchanging data at a predetermined time over a predetermined channel. Methods of negotiating rendezvous characteristics, such as rendezvous channel, time, frequency, duration and transmission power ensure that the selected link is tuned to minimize interference and power usage in the WN. A handshake mechanism enables high performance data delivery with minimal packet loss. The link based architecture uses Link State Advertisements, traffic tags and spanning trees to fine tune packet flow through divergent devices in the network.

20 Claims, 10 Drawing Sheets

(56) References Cited

U.S. PATENT DOCUMENTS

| | | |
|---|---|---|
| 2004/0190476 A1 | 9/2004 | Bansal et al. |
| 2005/0041601 A1 | 2/2005 | Kam et al. |
| 2005/0135305 A1* | 6/2005 | Wentink ......................... 370/329 |
| 2007/0070909 A1* | 3/2007 | Reeve ............................ 370/238 |
| 2008/0112325 A1* | 5/2008 | Sivakumar et al. ........... 370/238 |
| 2009/0031398 A1* | 1/2009 | Zheng et al. ....................... 726/3 |
| 2009/0268619 A1* | 10/2009 | Dain et al. ..................... 370/252 |
| 2010/0157813 A1* | 6/2010 | Matsuura ....................... 370/242 |
| 2011/0249664 A1* | 10/2011 | Chou et al. .................... 370/345 |

OTHER PUBLICATIONS

Eastlake, Donald E., "Routing and Rbridges", IEEE 802.11-04/1462r0; Nov. 2004.

\* cited by examiner

WIRELESS MESH ARCHITECTURE

CROSS-REFERENCE TO RELATED APPLICATIONS

This application is a continuation application of U.S. application Ser. No. 12/356,232, entitled Wireless Mesh Architecture, filed Jan. 20, 2009, which is a continuation application of U.S. application Ser. No. 11/054,221, entitled Wireless Mesh Architecture, filed Feb. 9, 2005, now issued as U.S. Pat. No. 7,505,751, the entire disclosures of which are incorporated herein by reference in their entireties.

FIELD OF THE INVENTION

This invention relates generally to the field of communication and more particularly to a wireless mesh architecture.

BACKGROUND OF THE INVENTION

As it is known in the art, a Wireless Local Area Network (WLAN) is a local-area network that uses high-frequency radio waves, rather than wires, to communicate between nodes. Various types of wireless LAN networks exist, and an example of a wireless data network is described in "IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band", incorporated herein by reference (hereinafter "802.11").

Two modes of wireless communication described in 802.11 include infrastructure mode and ad-hoc mode. In infrastructure node, at least one wireless device in the network serves as an Access Point (AP), while other wireless devices are referred to as stations. The AP serves as a communication hub, permitting users of a wireless device (or station) to connect both to a wired LAN and to each other through the AP. Software, executing at a station, selects the best Access Point available for connection to the LAN, taking into consideration various characteristics (such as signal power level and loading) of each AP connection. As stations move, associations are made with different Access Points to maintain a stations' connection with the wired LAN.

In ad-hoc mode, devices or stations communicate directly with each other, without the use of an access point (AP). Ad-hoc mode is also referred to as peer-to-peer mode or an Independent Basic Service Set (IBSS), which is capable of providing only a minimal service set to station devices. Thus an ad-hoc mode is useful for establishing a network where wireless infrastructure does not exist or where services are not required.

As the number of appliances having wireless access has increased, there has been an associated increase in the number of residential dwellings that have incorporated wireless networks. For example, wireless appliances which may be included in a residential dwelling include thermostats, security system, televisions, personal video recorders for high definition content (PVR-HD), audio receivers, telephones, personal computers. It is expected that the growth of residential appliances that are wireless enabled will continue to increase.

It is therefore desirable to provide a local area network that is capable of high performance data transfer in a residential multi-media wireless network. However, neither the infrastructure mode nor the ad-hoc mode of the current wireless LAN architecture supported by 802.11 addresses the data flow anomalies of a residential wireless network. It would be desirable to identify a new wireless architecture capable of transforming arbitrarily placed collections of wireless devices into a high performance multi-media backbone interconnect.

SUMMARY OF THE INVENTION

According to one aspect of the invention, a wireless mesh network includes a plurality of wireless nodes, wherein each wireless node is coupled to each one of the other wireless nodes by a dedicated link, and wherein a link is characterized by an agreement between two wireless nodes forming end points of the link to rendezvous for the purposes of exchanging data at a predetermined time over a predetermined channel.

According to another aspect of the invention, a method of establishing a link for wireless network communication between two end points includes the steps of the two end points negotiating a rendezvous, including selecting at least one rendezvous channel and rendezvous instance characteristic of the link. The method further includes the step of storing the rendezvous channel and rendezvous instance characteristic information at each of the end points of the link. The rendezvous start times occur within a cyclic mesh network transmit window. At each rendezvous time for a link, the end points exchange data for the rendezvous period on a preselected rendezvous channel. Logic at each node allows for intelligent routing of data packet through the network at the defined link rendezvous instances. With such an arrangement, a wireless network capable of supporting high bandwidth data transfer and extended services is provided.

DETAILED DESCRIPTION

Figure 1:
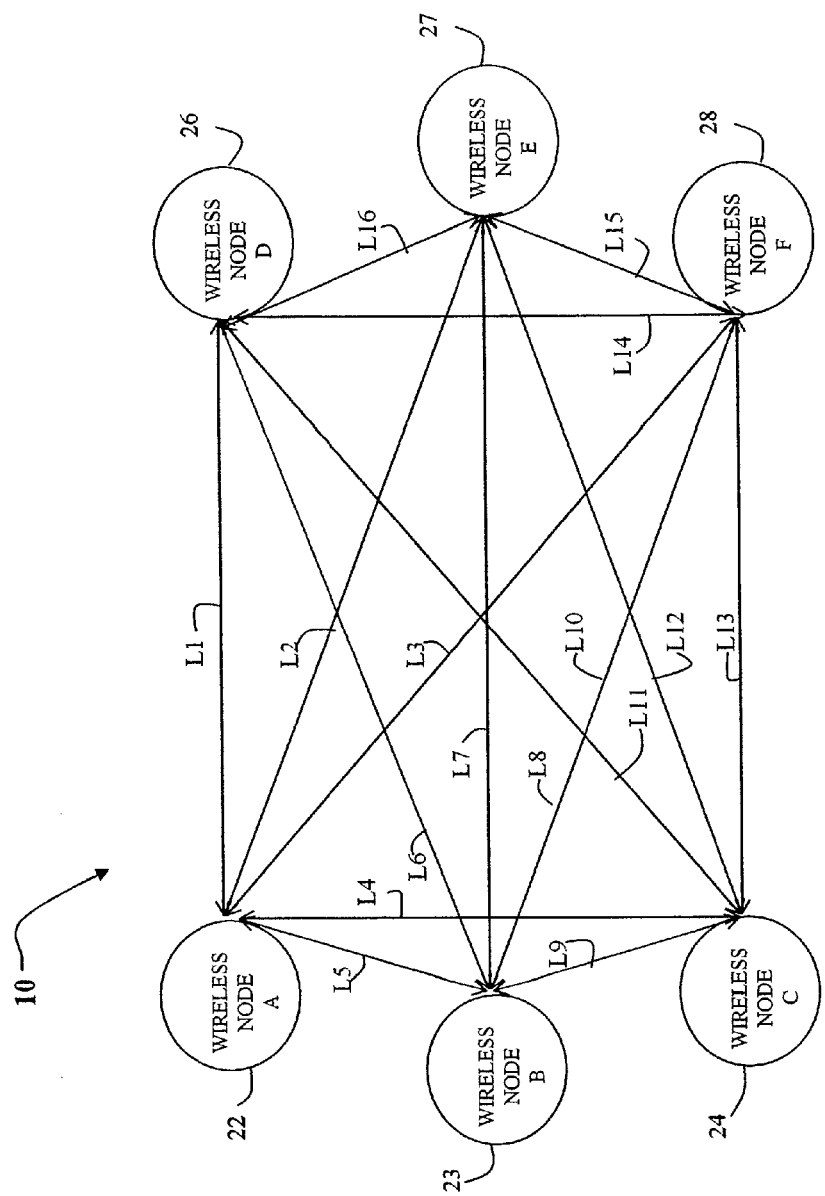
FIG. 1 is a diagram of a wireless mesh network of the present invention.

Referring now to FIG. 1, a wireless mesh network 10 according to the present invention is shown to include a number of wireless nodes (WN) A-F, each coupled with other discoverable node in the wireless network by a link, where a discoverable node is any node within the radio range of the WN. According to one aspect of the invention, a link is an agreement between two wireless nodes to rendezvous on a particular channel at a particular instance for data exchange. The wireless end points agree to a rendezvous channel and one or more rendezvous instance characteristics, the rendezvous channel identifying a channel frequency for transmission between the two nodes and the rendezvous instance characteristics describing various features of the link, such as the times, duration and power of the different rendezvous that define the link. The channel frequency which is selected for each link advantageously is a channel with the minimum interference from neighboring links. Rendezvous periods may be selected to minimize channel interference and power utilization at a wireless node.

The link may be unidirectional or bidirectional. In a system which uses unidirectional links between two end points, there may be different rendezvous channels and times for each direction of communication. In a system that uses bidirectional links, the rendezvous period may be apportioned as needed for communication by each of the end nodes. The wireless mesh network may include a combination of link structures, with some nodes using unidirectional links and some nodes having bidirectional links, and thus it should be understood that the present invention is not limited to a system wherein all nodes have identical communication protocols. Both the unidirectional and bidirectional link embodiments and their associated communication protocols will be described in detail below.

Once the network is configured, data routing through the wireless network links is intelligently managed using link state advertisements such that devices having low throughput capabilities are not used to forward high speed traffic. A link state advertisement is a packet which is sent between devices in a network, and describes the local state of a router or network. This includes the state of the router's interfaces and adjacencies. Each link state advertisement is flooded throughout the routing domain. The collected link state advertisements of all routers and networks form the protocol's topological database. In one embodiment of the present invention, link state advertisements are used in conjunction with a data exchange protocol implemented by each of the two end points of the link, to control data flow through the links while minimizing data loss.

As will become clear from the below description and figures, the wireless network architecture of the present invention is particularly useful in a residential multi-media environment because it permits high speed, direct communication between wireless nodes, while also providing data routing capabilities. The architecture enables network tuning for channel interference minimization, power optimization and traffic control with minimal modifications to existing wireless nodes. In addition, as will be described below, the wireless architecture of the present invention may be easily integrated with existing legacy architectures. One advantage of such a system is that it allows for easy integration of network of devices having dramatically different bandwidth requirements.

For example the wireless mesh network 10 of FIG. 1 may include any a number of wireless devices, which could include, for example, a stereo transmitter, wireless receivers, thermostats, security points, wireless routers, cell phones, central control panels, etc. Assuming wireless node B is a Digital Video Device and wireless node E is a monitor, the bandwidth required at link L7 in the direction from node B to node E must be sufficient to support streaming of real time audio and video information. Assuming wireless node A is a central control panel and wireless node F is a wireless thermostat, the frequency of use and bandwidth requirements for link L3 are quite small. The initialization and optimization steps involved in setting up a wireless mesh network according to the present invention will be described after a brief description of several exemplary components of the Wireless Node hardware.

The Wireless Node

From a hardware perspective, a Wireless Node (WN) such as WN A 22 includes the same hardware as existing Wireless 802.11 station (STA). There may even be WNs that contain multiple STA hardware (multiple radios), but typically only one instance of STA hardware is necessary to support this architecture. One example of a wireless processing device capable of supporting the present invention is the Engim's EN-3001 Intelligent Wideband WLAN Chipset, manufactured by Engim of Acton Mass., although any device capable of supporting the below wireless mesh architecture protocol may alternatively be used.

In general the hardware of the WN is an 802.11 STA that can maintain N simultaneous ad-hoc links. The use of the same underlying hardware facilitates integration of system utilizing the present invention with legacy wireless networks. The novel WN communication protocol of the present invention manages wireless connections while taking advantage of a power save mechanism to juggle these multiple connections. Through appropriate spacing of rendezvous points for the different links, it can be ensured that the wireless node awakes only when a likelihood of receiving communications exists.

Figure 2:
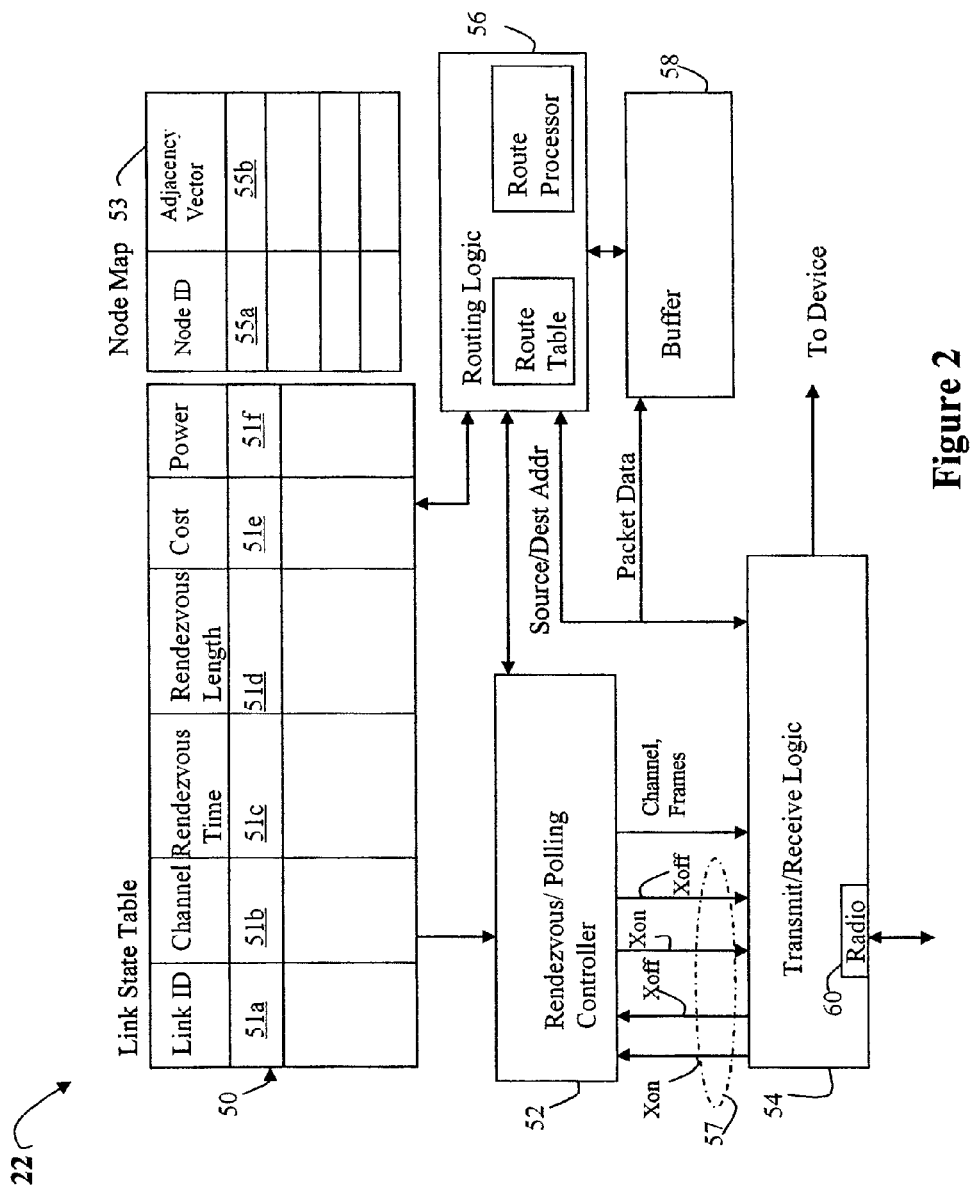
FIG. 2 is a block diagram illustrating several representative functional elements that may be included in a wireless node used in the architecture of the present invention.

FIG. 2 illustrates several exemplary components of a wireless node, such as WN 22. If should be noted that the components illustrated in FIG. 2 are embodiments of processes or data structures which may be implemented in hardware, software or any combination thereof. In addition, although certain functions are represented as discrete blocks it is appreciated that the functionality that is described may be differently delineated, and thus the present invention is not limited to embodiments having components specifically recited in FIG. 2.

A wireless node 22 is shown to include a link state table 50. At each wireless node, there will be at least one link state entry for every other known node in the wireless mesh network Alternatively, depending upon the underlying hardware of the node, number of radios at the node and the different types of information communicated between the two end points, there may be multiple links defined in the link table for a single end point pair, each having a different link ID and potentially different rendezvous time, channel, cost or other information associated with the link.

An exemplary link state table entry is shown FIG. 2 to include information for identifying the link (the link ID 51$a$, the link channel 51$b$) and also to include rendezvous instance information, identifying the length, duration and transmit power of the rendezvous which comprise the link (the link rendezvous time 51$c$ and the rendezvous length 51$d$ and link power 51$f$). The link entry advantageously includes a link cost 51$e$. Other entries that further serve to characterize the link may alternatively be used, and the present invention is not limited to the particular set of entries described herein. As will be described in more detail below, the cost of the link can be set to control the frequency of use of the link when routing, to limit the transmission of data with high bandwidth requirements through simple devices (for example to preclude the forwarding of audio packets through a thermostat).

Also included in the WN 22 is a node map 53. The node map 53 stores a node identifier and an adjacency vector for each node discovered by WN 22 in the wireless network. As will be described in more detail below, discovery of nodes in the wireless mesh network is achieved by each node periodically polling the network to determine which other nodes are present. Each WN beacons on a hailing frequency (for example there are two hailing frequencies used for 802.11; channel 1 in the 2.4G band and channel 52 in the 5G band). When a new WN enters the wireless network, it listens on the hailing frequency in order to discover the other wireless nodes, and calculates its adjacency vector sum.

The adjacency vector sum is a numerical value which reflects, for each channel, the number of other WNs heard by the WN 22 on that channel and the strengths of the signals heard by the WN 22. Thus the WN keeps track of the number of different WNs it hears (based on WN IDs received in a polling period) and the average signal strength from each WN. The WN builds an adjacency vector sum (adjacency count, adjacency power total) for itself, and periodically forwards the adjacency vector sum to other nodes.

The WN 22 is also shown to include Rendezvous Controller 52 and routing logic 56. The Rendezvous Controller 52 controls the establishment and management of rendezvous between two end points of a link and thus controls the selection of a transmission channel for packet data transmitted from the WN. As will be described in more detail below, Handshake signals 57 control the flow of data between two endpoints during a rendezvous. Routing logic 56 works in conjunction with the rendezvous controller to appropriately receive and forward data through the wireless node. Buffer 58 provides temporary storage of the packets routed through the device. Transmit and Receive logic may include one or more radios 60. Other functionality, such as elements that further improve traffic management, provide security or otherwise enhance the network operation may be included within the Wireless Node as needed.

Link Initialization

Figures 3A, 3B:
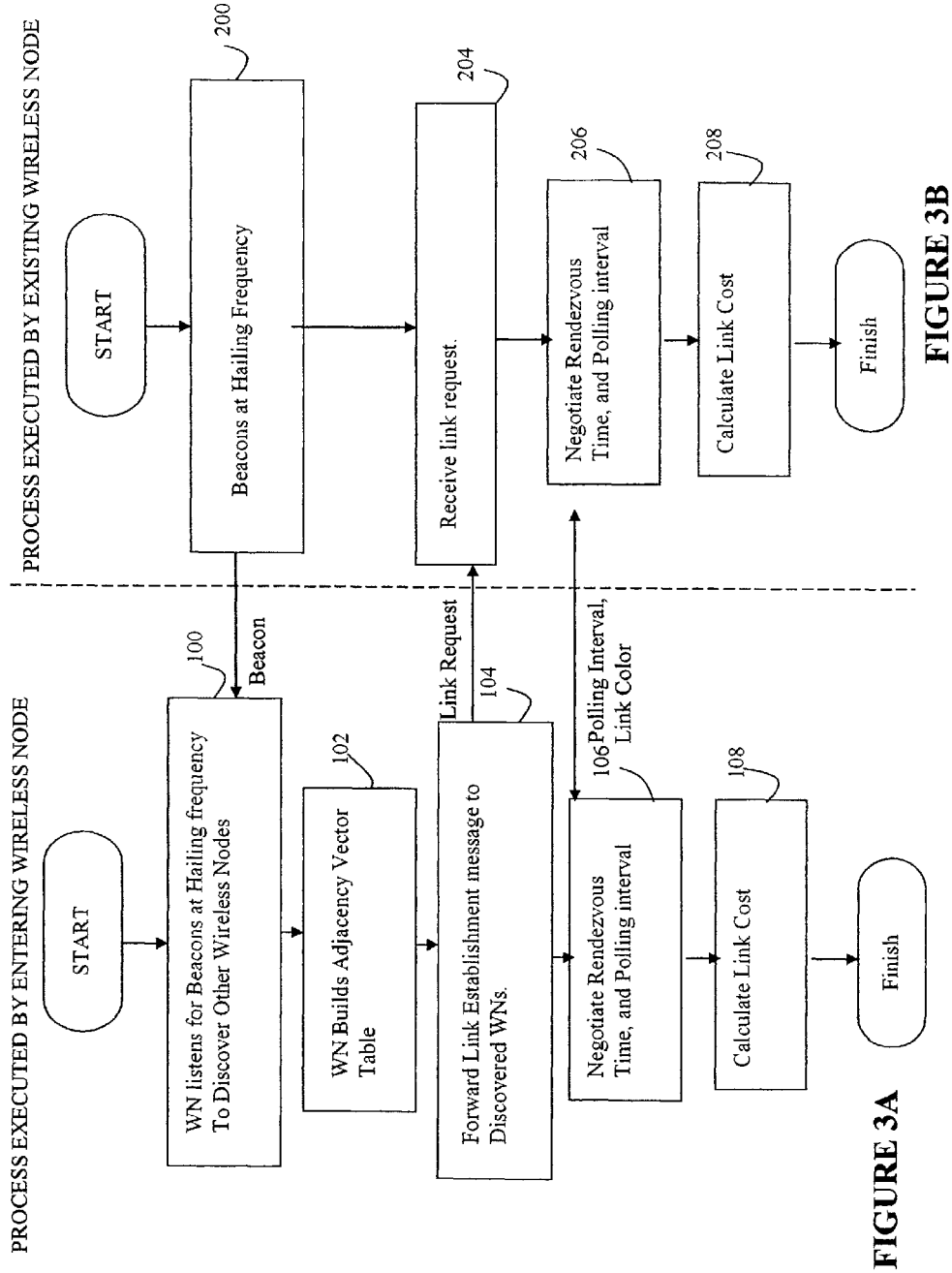
FIGS. 3a and 3b are flow diagrams illustrating steps that may be performed to establish a communication link between a pair of wireless nodes in the networks of FIG. 1.

As mentioned above, a link is an agreement between exactly two WNs to rendezvous on a particular channel at a particular time for attempted data exchange. The flow diagrams of FIGS. 3A and 3B illustrate an exemplary link establishment process which may be performed in the present invention. At step 100, a wireless node entering the system (hereinafter "an entering wireless node"), monitors the hailing frequency. As described in pending patent application "Transmission Channel Selection Apparatus" Ser. No. 10/781,22, filed Feb. 18, 2004 (incorporated herein by reference and hereinafter referred to as the Channel Selection patent), each device in the wireless network forwards beacons at randomly skewed intervals on the hailing channel (as shown at step 200). The skewing of beacons causes power save cycles of the WN to stay out of synchronization, ensuring that both nodes will periodically be awake at the same time. The entering WN will also initiate beaconing at random intervals to indicate its presence in the network.

When the entering WN hears a beacon from another node in the wireless network, at step 102 the WN uses this information in the calculation of its adjacency vector (AV), and stores the node ID in the node map 53. The entering WN forwards a link establishment message to the discovered WN. The link establishment message may take many forms, but essentially communicates the MAC address and the AV of the entering WN to the existing WN. Following authentication of the entering node by the existing WN (through any known authentication technique or alternatively through methods described in pending patent application Ser. No. 10/807,484 entitled "Method and Apparatus for Securing Communication between Wireless Devices", filed Mar. 23, 2004 by Vacon et al.), the existing WN prepares a response to the entering WN. The reply issued by the existing WN includes the existing nodes' MAC address and AV. One of the two end points is selected as the endpoint to identify a polling period. The selection of which endpoint to use to identify the polling period is a matter of design choice and can be based on any node information, such as the MAC address, SSID, AV, type of device or any other information available.

At steps 106 and 206 the entering node and the existing node being the process of negotiating the link characteristics. At least two of the characteristics that are negotiated are the time and place of the rendezvous between the two nodes, wherein the time of the rendezvous is referred to herein as the rendezvous period (time and duration of a polling period between the two nodes), and the place of the rendezvous is referred to as the rendezvous channel.

Figure 4:
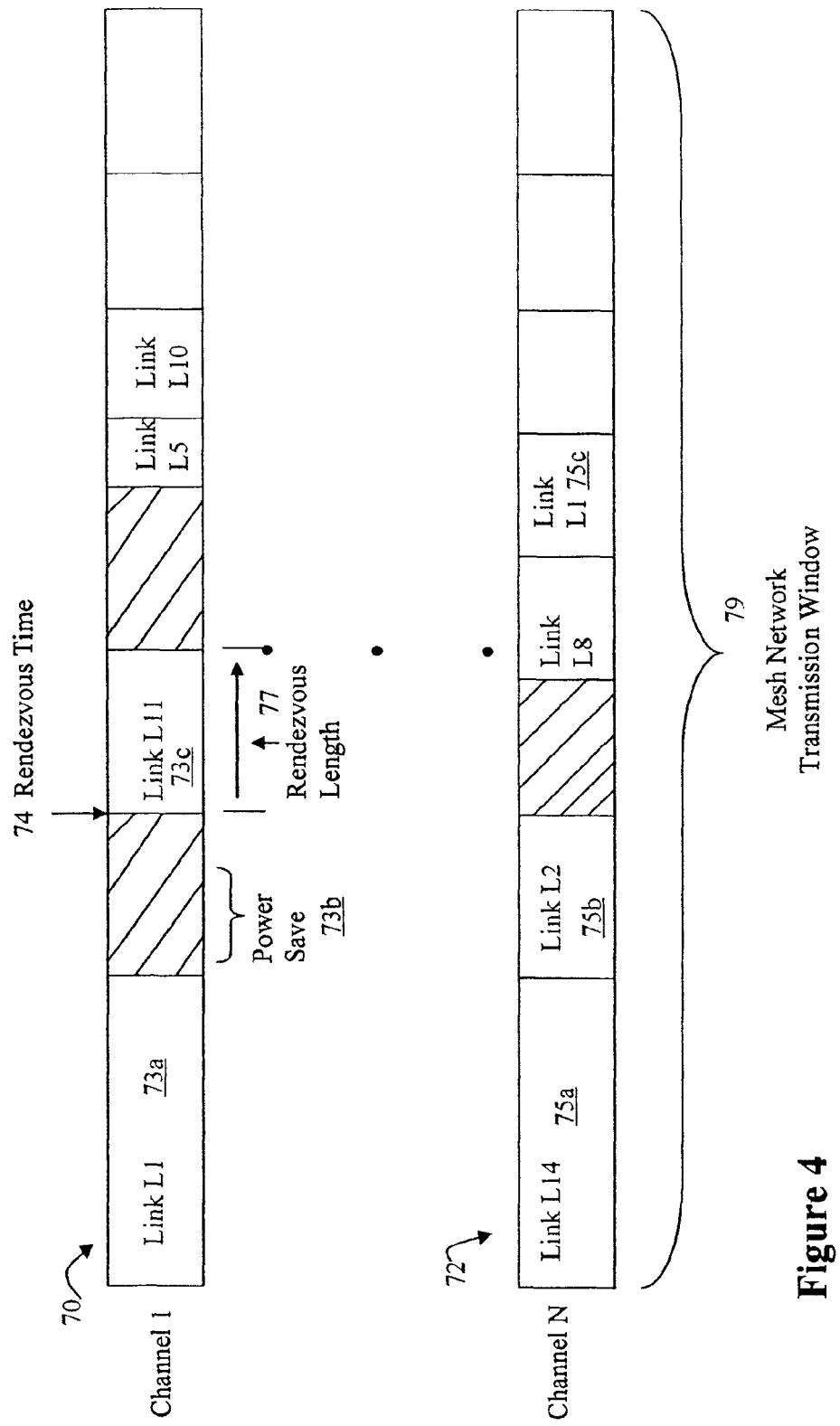
FIG. 4 is a timing diagram provided for the purposes of illustrating rendezvous periods that are allocated to different wireless links in the wireless network architecture of FIG. 1.

Referring briefly to FIG. 4, a timing diagram illustrating exemplary link assignments to channels within a mesh network transmission window 79. The mesh network transmission window identifies transmissions that occur during one period of a cyclic network transmission process. Similar to a time-division multiplex (TDM) system, each link is associated with one or more time slot on one of N available communication channels. For example, Channel 1 forwards information between WN A 22 and WN D over Link 1 during rendezvous period 73a and on channel N during rendezvous period 75a. At the same time in the wireless network, node D 26 may be exchanging communication with node F 28 over link L14 on channel N. The various channels have randomly spaced power save rendezvous. The power save rendezvous periods may be controlled through programming at the WN itself, or may be a consideration in a decision making process at a WN when it selects a desired rendezvous period. WNs of the present invention should have the ability to change their channels frequently. If a WN has multiple radios, it may choose to set up links across these radios in a round robin way across the set of radios that support the same band. Radios in different bands set up links to other WNs that also support the same band. Alternatively, a WN may set up multiple, equal cost links to another WN using different radios, although in the present invention only one of the links would be used at any point in time.

Figure 5:
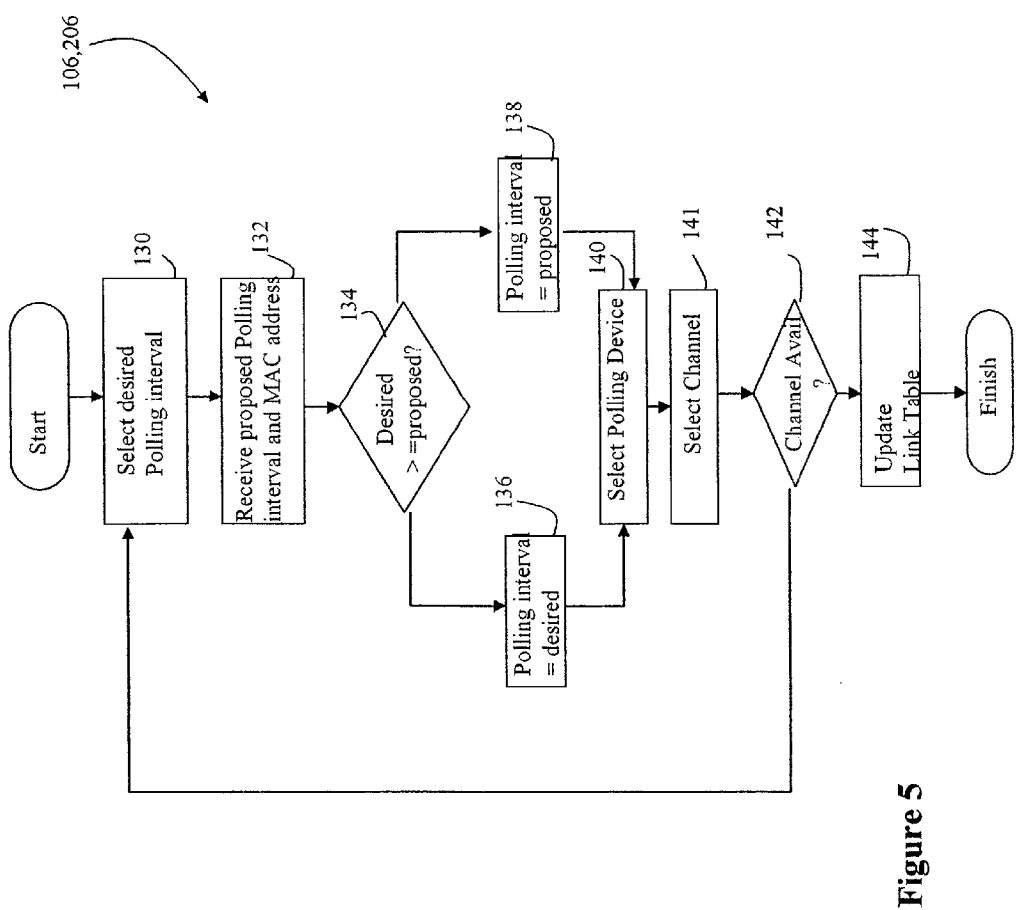
FIG. 5 is a flow diagram illustrating several exemplary steps that may be performed by a wireless node when negotiating link rendezvous terms.
Figure 6:
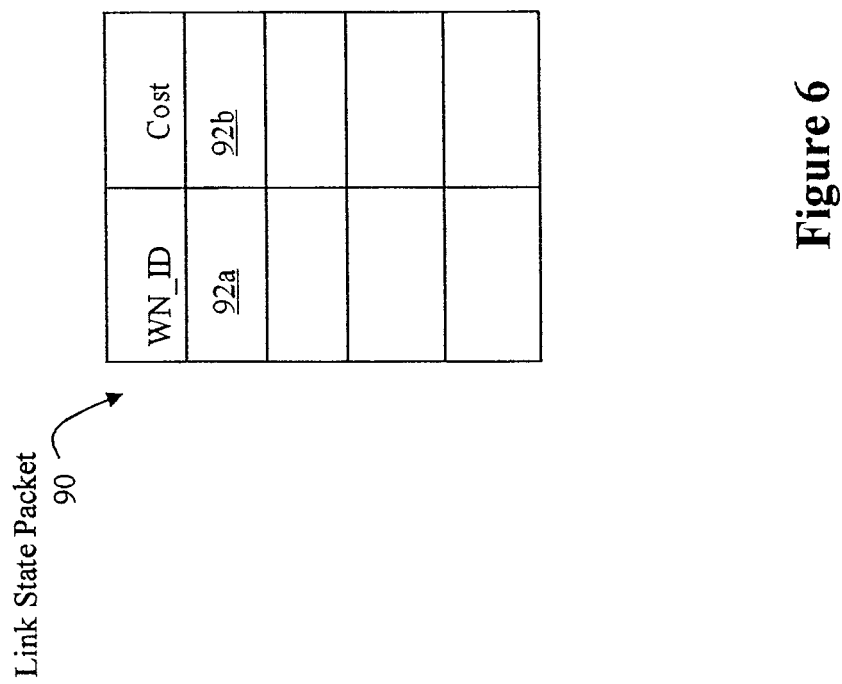
FIG. 6 illustrates an exemplary link state table that may be stored at a wireless node of the present invention.

Referring now to FIG. 5, exemplary steps in a process which may be executed at both the entering node and the existing node for negotiating the time and place of rendezvous is shown. According to one aspect of the invention, all transmissions by all of the nodes occur during one or more intervals of time on one of N available channels during the network transmission window 79. The length of the transmission window may vary with the number of nodes that are in the wireless mesh network, and may be programmable to allow a network administrator to fine tune network performance. At step 130, each WN selects a desired polling interval for communication over a link coupling the two WNs. The polling interval specifies a rendezvous start time and a rendezvous length. The initial polling interval selected may be any default polling period associated with the device, but is advantageously related to a frequency and type of the data that is to be forwarded or received by the device. Thus systems which transfer large streams of data may desire a higher polling interval, while those whose data changes infrequently may select a shorter polling interval. It can be appreciated that the duration of a polling period is related to the cost of the link; those links having a long polling period.

At step 132, during the link negotiation process each WN will receive from the other end point WN of the link a proposed polling interval. The proposed polling interval also includes the proposed rendezvous length. Advantageously the polling interval having the longest rendezvous length is selected so that devices having larger amounts of data to transfer will receive adequate bandwidth.

Thus, if at step 134 the desired rendezvous length is greater than the proposed rendezvous length then at step 136 the desired polling interval is selected. Otherwise at step 138 the proposed polling interval is selected.

After the polling interval has been identified, the WN that is to perform the polling is selected at step 140. In one embodiment, the WN that is selected to perform the polling is the one with the lowest MAC address, although other methods of selecting the device, such as by comparing the types of devices or AVs of the WNs could also be used.

At step 142, once the time and duration of the rendezvous is agreed to, the two end points of the link select a channel for transmission between the two end points. In one embodiment, the selection of the channel is advantageously performed by the WN having the highest adjacency vector (AV), because the node with the highest AV is the one that is open to the higher levels of channel interference. In general the channel is selected by the WN in order to minimize interference with other links, and for example may be performed using the methods described in the Channel Selection patent referenced above. However, it should be nodded that in contrast to the prior art channel selection patent, which selects channels for AP transmissions to numerous STAs, in the present invention channel selection is performed on a link level granularity.

Once a channel has been selected, at step 142 it is verified, by the polling WN, whether that the channel is available at the desired polling interval. If not, the process may either proceed to step 130, as shown, to identify a different polling period, or alternatively to step 141, to select another channel for transmission during the selected period. It should be noted that the method illustrated in FIG. 5 is exemplary only, and other methods that may intelligently select a rendezvous period that provides adequate bandwidth for a given transfer on a channel which minimizes interference at the nodes may alternatively be used.

Link Optimization:

Once the initial links are defined, the network is capable of forwarding packet data between any WN in the network. However, as described above there are certain wireless devices that are more appropriate for data forwarding than other wireless devices. In addition, it may be that some nodes in the network are not discoverable by other nodes in the WN, due to various transmission powers of the WNs and the distances between the WNs. For this reason, it is desirable to be able to intelligently route data packets within the wireless mesh network. For this reason, one embodiment of this invention uses link state advertising (LSA) to assist in packet routing.

Each WN in the network periodically forwards an LSA packet to all of the other nodes in the network. Thus at periodic intervals, the rendezvous slot associated with two end points on a link will carry LSA information from each of the end points. The link state packets include a table 90 which includes an identifier of a known WN in the network (WN_ID 92), and a cost associated with reaching the associated WN by the WN forwarding the link state packet. The cost of the link may be determined by balancing a variety of information about the WNs coupled to the link, including the frequency and duration of rendezvous slots allocated to the link, a Quality of Service (QoS) associated with the link or other known methods of identifying costs. For example, cost may be inversely proportional to the bandwidth at which a particular WN is willing to forward traffic to that particular WN. Cost may also be a function of the amount of time a WN is willing to be awake; thus sleepy WNs advertise very costly links.

Link optimization can thus be used to make a known link largely invisible, if it is desired to have low utilization of the link. As mentioned above to achieve this, the link may advertise a high cost to reach itself. The node may further deter unwanted traffic by forwarding an empty LSA, thereby indicating that it is not available to route to any of the other links.

In one embodiment, as each node receives LSA packets, it uses the link cost information to select the best route for forwarding data to coupled nodes. In one embodiment, the 'best' path may be the shortest path, determined, for example, using an algorithm (such as Dykstra's) to determine the shortest path of a weighted graph from a single source to all destination vertices. Alternative methods known in the art of selecting a 'best path' may be used without affecting the scope of the present invention. Such methods include performance monitoring and load balancing techniques. The periodic LSA transmissions enable the network to maintain accurate routing information.

Data Exchange Protocol

Once links have been established and routes are optimized, data packets can be forwarded through the mesh network. It should be noted that a variety of manners may be used to transfer the data between the end points during the rendezvous time, and although several embodiments are described below, the present invention is not limited to these particular embodiments.

According to an X-ON, X-OFF embodiment, when both end points rendezvous at the same time and place, a simple handshake mechanism is used for data exchange. In particular, each node includes the ability to send an X-ON packet and an X-OFF control packet to the coupled end point on the link. The X-ON and X-OFF signals may be used for links that have single mode or duplex characteristics.

Figure 7:
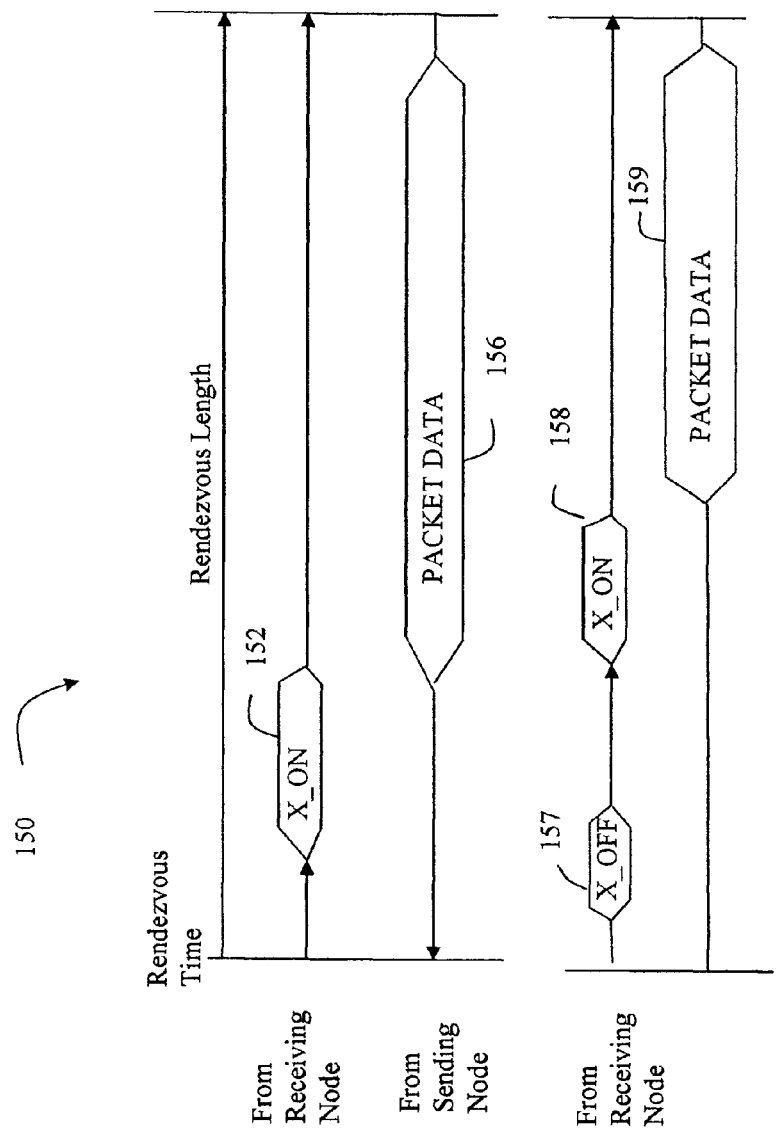
FIG. 7 is a timing diagram provided for the purposes of illustrating data handshake between two end points having rendezvoused at a link.

Referring now briefly to FIG. 7, a timing diagram is provided for illustrating data transfer between end points of the node using the present invention. At the start of the rendezvous period, both nodes tune to the agreed rendezvous channel. One of the nodes has been previously selected as the node that initiates the data transfer. This decision may be made, for example, based on a lower MAC address of the pair, or a type of devices of each of the pair, or any other method of selecting an end point as a transmitter. For unidirectional links, the source of the link is the first to transmit. For bidirectional links, a separate rendezvous point within the wireless network transmit window may be used for the other direction of communication. In addition, more complex logic could be used to apportion the duration of the rendezvous between the two devices, and the present invention is not limited by which end point initiates communication. Suffice it to say that one end point will be the transmitting end point, while the other end point will be the receiving end point for a given rendezvous.

According to one aspect of the present invention, two control packets are used by the end points for handshaking communications. The X_ON packet is forwarded by the receiving end point at the start of the rendezvous to signal to the transmitting end point that the receiver has capacity to receive a transmission. The X_OFF packet is used to explicitly tell the transmitting node that the receiving node is not ready for communications. In the present invention, each wireless node, if present, will always make its rendezvous, and thus there will always be the X_ON or X_OFF packet transmitted at the start of the rendezvous. An absence of either signal may be used to determine the exit of the wireless node from the network.

In one embodiment of the invention, a transmitting wireless node will start to transmit packet data once it receives the X_ON signal, and will continue until the end of the rendezvous period. It will be appreciated that there may be a period before the end of the rendezvous by which the transmitting node needs to stop transmission to allow the receiving node to meet a different rendezvous. Alternatively, rendezvous periods may be spaced to ensure that packets will not be dropped as rendezvous points for the various links are switched.

It may occur, at the start of a rendezvous period, that a WN is in the middle of exchanging data on another link of a previous rendezvous. For real time streaming data it is important to minimize interruptions with the data transfer. However, it is important to the present design that each wireless node always makes its rendezvous. For this reason, the X_OFF control packet is provided. The X_OFF control packet signals, at the start of a rendezvous, that the end point that is to receive the data does not have available resources. Thus, X_OFF could be used when the resources are committed to another link.

In the timing diagram of FIG. 7, at time 156, at the start of the rendezvous, the receiving node transmits the X_OFF signal. The receiving node then may do what is necessary to make the resources available, (for example, by completing data transfer on another link). Should the other transfer complete during the rendezvous, the receiving node will return to the rendezvous channel and forward the X_ON signal to the transmitting node. The transmitting node waits on the channel for the remainder of the rendezvous period, awaiting the detection of an X_ON packet. Only after the X_ON packet 158 is received does the transmitting node stream data to the receiver.

Accordingly, through the use of simple handshake signals, high quality delivery of high speed streamed data may be obtained.

Figures 8, 9:
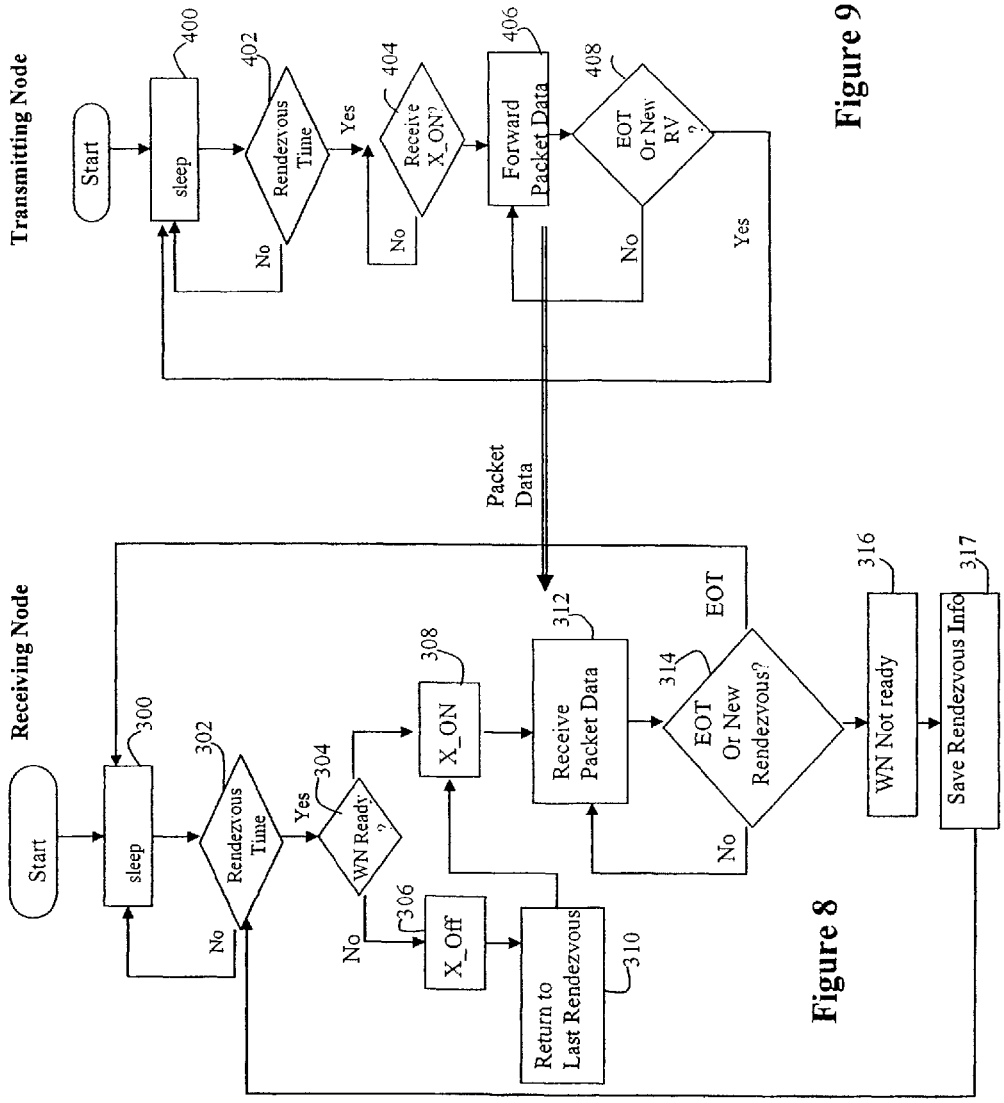
FIG. 8 is a flow diagram illustrating several exemplary handshaking steps that may be performed at a wireless node of the present invention that is receiving data at during a rendezvous.
FIG. 9 is a flow diagram illustrating several exemplary handshaking steps that may be performed at a wireless node of the present invention that is forwarding data during a rendezvous.

FIGS. 8 and 9 are flow diagrams which are provided to illustrate exemplary steps that may be performed at a transmitter and receiver during data exchange. At steps 300 and 400 both the receiving node and transmitting node are 'asleep' until the start of the next rendezvous period is detected at s 302 and 402. The receiving node proceeds to step 404, where it determines whether it is ready to accept data. If the receiving node has the resources available to accept the data, then at step 308 the WN forwards an X_ON packet to the transmitting node. Detecting the X_ON at step 404, the transmitting node begins forwarding packets at step 406, and the receiving node receives them at step 312. The transmitting node will continue to forward packets until the transmission is complete (EOT) or a new rendezvous occurs. Both end points continue to monitor for the end of data transfer (EOT) or the occurrence of a new rendezvous period for that WN. If an EOT is detected by the receiving WN before the end of rendezvous period, the process returns to step 300, where the receiving WN awaits the next rendezvous.

If, however, the data transfer is not complete at the end of the rendezvous, the receiving WN sets internal state to Not Ready at step 316, and saves the current rendezvous information (i.e., channel, power, etc.). The process proceeds to step 302, where the next rendezvous starts. At step 304, however, when the next rendezvous starts it is determined that the WN is Not Ready, and an X_OFF is forwarded to the transmitting node. At step 310, the previous rendezvous information is loaded so that the previous transmitting WN can complete its data transfer. Note that this process will continue until the data transfer is completed.

It is recognized that such a situation may cause a link to become starved. However, should a link become starved, the network may be tuned by lengthening the duration of the rendezvous, changing transmission channels for the link or routing other transmissions around the link.

As stated above, the X-ON/X-OFF data protocol is only one method that can be used to transfer data between nodes in the WN network. The described system may be modified if the link is capable of duplex communication, by permitting the sending node to always start transmission at the start of a rendezvous period, and using the X-OFF signal to stop the transmission by the node when the receiving node is incapable of receiving transmissions. The X-ON/X-OFF signals are used to switch the flow of the transmitter on or off in such an embodiment.

Figure 10:
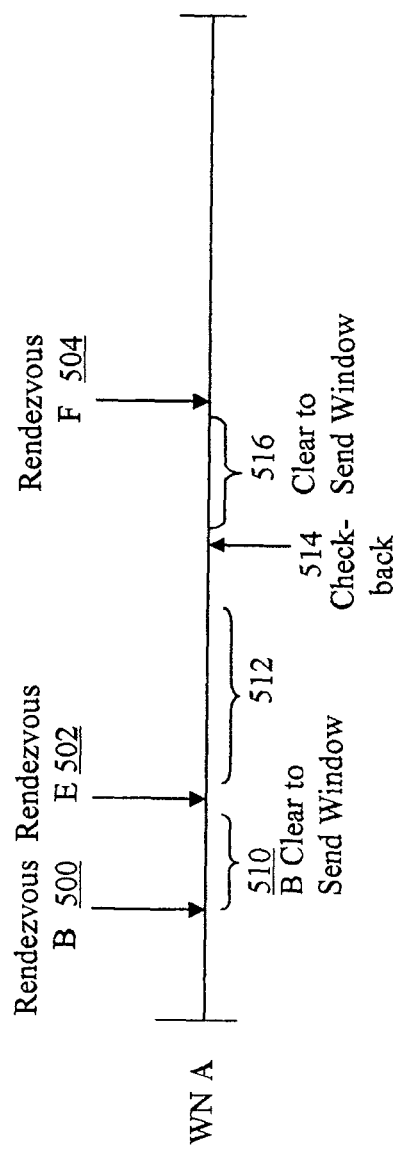
FIG. 10 is a timing diagram provided to illustrate a second embodiment of a data exchange protocol system which may be used in the present invention.

Alternatively, an acknowledgement protocol which uses, for example, Ready To Send (RTS) and Clear To Send (CTS) handshake signals may be used. In such an embodiment, a transmitting WN forwards the RTS signal to the receiving WN, and awaits an acknowledgement (CTS) signal from the receiving WN. In one embodiment, the CTS signal may specify a period of time that the receiving WN is able to receiving transmissions before it needs to go to its next rendezvous. For example, referring now to FIG. 10, a timing diagram illustrating exemplary rendezvous points for a WN A with other WNs in the mesh network is shown. WN A rendezvous with WN B at time 500, with WN E at 502 and WN F at 504. When WN A forwards a CTS signal to WN E, it may include a CTS window 510. The CTS window may be smaller than the agreed Rendezvous time period between the two nodes. Advantageously, the receiving WN may also return a proposed check-back time to the transmitting WN, indicating another time, different from their negotiated rendezvous point, when the receiving WN anticipates that it will be able to receive additional data from the transmitting node. Thus in FIG. 10, the WN A may also forward, with the CTS and CTS window 510, a check back time 514 and check back window 516 which WN B may also use for transmissions. The use of CTS windows and the check back functionality gives the receiving node the ability to dynamically fine tune the data transfer around the existing rendezvous structure. It is noted, however, that there are numerous known data exchange protocols available, any of which may be substituted herein, and the present invention is not limited by the disclosed procedures provided above.

The wireless network architecture of the present invention is thus resilient and may be intelligently tuned according to a type of traffic. Traffic servicing can be further controlled through the use of standard priority tags as described in IEEE 802.1Q, Virtual LANs specification, incorporated herein by reference. In general, traffic tags are identifiers attached to the traffic which control the placement of traffic in high priority queues at the node interfaces. A fair queuing scheme that reserves a minimum bandwidth for small users is implemented at each WN interface. With such an arrangement, devices such as a thermostat can be guaranteed a minimum communication bandwidth.

Figure 11:
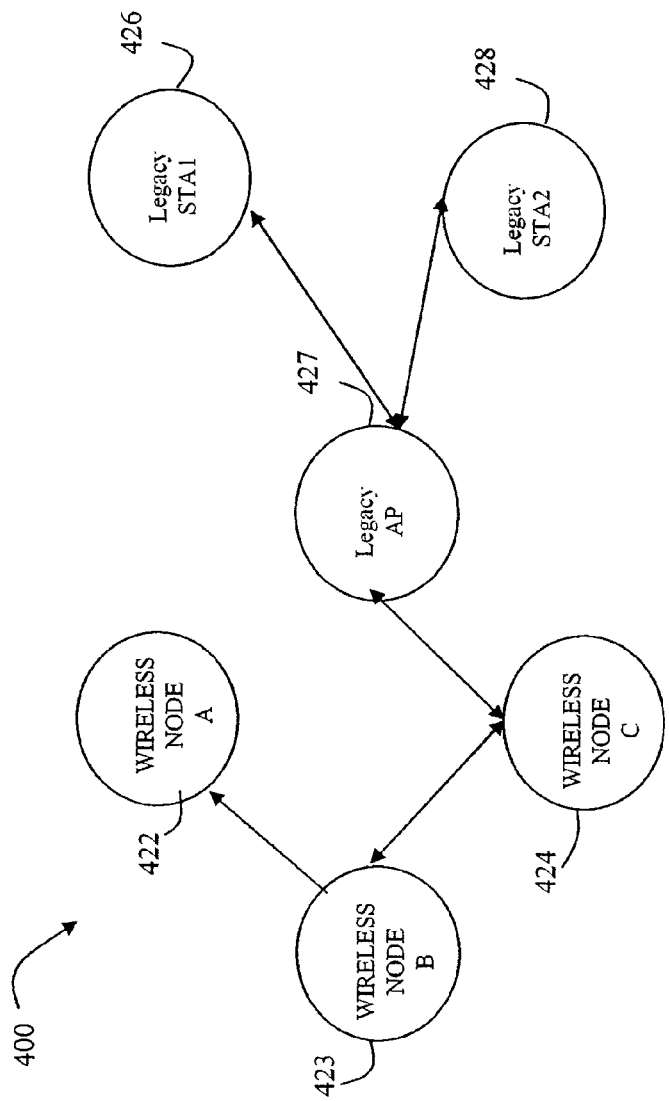
FIG. 11 is a block diagram illustrating the integration of legacy wireless network systems with the present invention.

One advantage of the WN architecture of the present invention is that it may easily be integrated with APs of legacy 802.11 networks. Existing residential wireless networks may include, for example, a cable modem coupled to a wireless router for communication with several personal computers. Wireless Nodes having the capabilities and features described above may easily be integrated into such a system as shown in FIG. 11. In FIG. 11, a legacy AP 427 may communicate with existing legacy STAs 426 and 428. WNs of the present invention use the same Beaconing protocol for establishing initial links as the existing legacy system. Thus a WN such as WN 422 may establish a link with either the legacy AP 427 using rendezvous agreements as described above.

In an embodiment where the legacy AP does not integrate the WN capabilities described above, any connected legacy STAs (such as legacy STA1 426 and legacy STA2 428) include IP addresses that are not broadcast to the wireless mesh network. Access to these STAs is performed through the inclusion of a spanning tree protocol (STP) in its design. The spanning tree protocol is a link management protocol that is part of the IEEE 802.1 standard for media access control bridges. Using the spanning tree algorithm, STP provides path redundancy while preventing undesirable loops in a network that are created by multiple active paths between stations. Loops occur when there are alternate routes between hosts. To establish path redundancy, STP creates a tree that spans all of the WNs in an extended network, forcing redundant paths into a standby, or blocked state. STP allows only one active path at a time between any two WNs (this prevents the loops) but establishes the redundant links as a backup if the initial link should fail. According to one embodiment of the invention, the root of the spanning tree is that WN having the highest Adjacency Vector sum (i.e., is the closest to the center of the network). As the AV sums change, or if one link in the STP becomes unreachable, the spanning tree algorithm reconfigures the spanning tree topology and reestablishes the link by activating the standby path. Without spanning tree in place, it is possible that both connections may be simultaneously live, which could result in an endless loop of traffic on the LAN.

Once the spanning tree is identified, it can be used for multicast streaming of messages, and also for accessing legacy STAs. Thus, when a WN receives a packet having an unknown destination, the packet is forwarded using the established spanning tree. As a result, connectivity between legacy systems and the WN mesh of the present invention is facilitated.

Thus a several exemplary embodiments of processes and components which together support the wireless mesh network architecture of the present invention have been shown and described. Each wireless node in the network is connected to every other wireless node in the network. Each pair of wireless nodes is coupled by a link dedicated to exchange of data only by the nodes. The link is characterized by an agreement between two wireless nodes forming end points of the link to rendezvous for the purposes of exchanging data at a predetermined time over a predetermined channel. Methods of negotiating rendezvous characteristics, such as rendezvous channel, time, frequency, duration and transmission power ensure that the selected link is tuned to minimize interference and power usage in the WN. A handshake mechanism enables high performance data delivery with minimal packet loss. The link based architecture uses Link State Advertisements, traffic tags and spanning trees to fine tune packet flow through divergent devices in the network.

Having described exemplary embodiments, it will be appreciated that various modifications may be made without diverging from the spirit and scope of the invention. For example, several figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:

1. A method of establishing a wireless network communication channel from a first end point, the method comprising:
  negotiating from the first end point a rendezvous with another endpoint to select at least one rendezvous channel and at least one rendezvous temporal characteristic of the link; and
  storing the at least one rendezvous channel and at least one rendezvous duration temporal characteristic at the first end point;
  wherein the negotiating to select the at least one rendezvous duration temporal characteristic comprises, at the first end point:
    selecting a desired rendezvous duration;
    receiving a proposed rendezvous duration; and
    selecting, as a rendezvous duration of the link, the greater of the desired rendezvous duration and the proposed rendezvous duration; and wherein the at least one rendezvous temporal characteristic further includes a rendezvous time.

2. The method according to claim 1, wherein the at least one rendezvous temporal characteristic includes a rendezvous length.

3. The method according to claim 1, wherein the rendezvous is defined as a polling interval of a mesh network transmission window.

4. The method according to claim 3, wherein the rendezvous comprises multiple polling intervals of the mesh transmission window.

5. The method according to claim 1, further comprising of the first end point broadcasting a cost for the link to other end points in the network to control utilization of the link during routing of packets in the network.

6. The method according to claim 5, wherein the cost is communicated as part of a link state advertisement periodically broadcast.

7. A method of establishing a wireless network communication channel from a first end point, the method comprising:
negotiating from the first end point a rendezvous with another endpoint to select at least one rendezvous channel and at least one rendezvous temporal characteristic of the link; and
storing the at least one rendezvous channel and at least one rendezvous temporal characteristic at the first end point;
wherein selecting a rendezvous channel comprises, at the first endpoint:
calculating an adjacency vector sum characterizing a density of wireless nodes near the first endpoint;
receiving an adjacency vector sum of the another endpoint; and
selecting the rendezvous channel in response to the adjacency vector sum of the first end point being higher than the received adjacency vector sum of at the other endpoint.

8. The method according to claim 7, wherein selecting the rendezvous channel further comprises selecting a channel having minimal interference for a given rendezvous time and rendezvous duration.

9. The method according to claim 7, wherein the at least one rendezvous temporal characteristic is at least a rendezvous time and a rendezvous length.

10. The method according to claim 7, wherein the rendezvous is defined as a polling interval of a mesh network transmission window.

11. The method according to claim 10, wherein the rendezvous comprises multiple polling intervals of the mesh transmission window.

12. The method according to claim 7, further comprising broadcasting a cost for the link from the first end point to other end points in the network to control utilization of the link during routing of packets in the network.

13. The method of claim 12 wherein the cost is communicated as part of a link state advertisement periodically broadcast.

14. A wireless end node, comprising:
a link table for storing rendezvous information associated with a link; and
a rendezvous controller, coupled to the link table, for controlling transmissions to another wireless end node over the link; and
a node map, coupled to the rendezvous controller, for storing identifiers and adjacency vector sums associated with at least another wireless node in the network,
wherein the wireless end node is coupled to the another wireless end node in a network by a dedicated link, wherein the dedicated link is established based on an agreement between the wireless end node and the another wireless node to rendezvous for the purposes of exchanging data at a predetermined time over a predetermined channel.

15. The wireless end node of claim 14, wherein the rendezvous controller further comprises logic for controlling negotiation of rendezvous information between the wireless end node and another wireless end node associated with the link.

16. The wireless end node of claim 15, wherein the rendezvous controller uses adjacency vector sum information in the node map to select a channel for the rendezvous.

17. The wireless end node of claim 14, further comprising data exchange protocol logic for managing packet transfer during the rendezvous.

18. The wireless end node of claim 14, further comprising logic for identifying costs of the link in the link table.

19. The wireless end node of claim 18, wherein the costs stored in the link table are enabled to be programmed by the wireless end node to preclude routing through the wireless end node.

20. The wireless end node of claim 18, wherein the costs stored in the link table are obtained in response to link state advertisements received at the wireless node.

* * * * *